Feb. 26, 1952     H. R. MEYER     2,587,060
APPARATUS FOR LUBRICATING INTERNAL-COMBUSTION ENGINES
Filed March 2, 1946
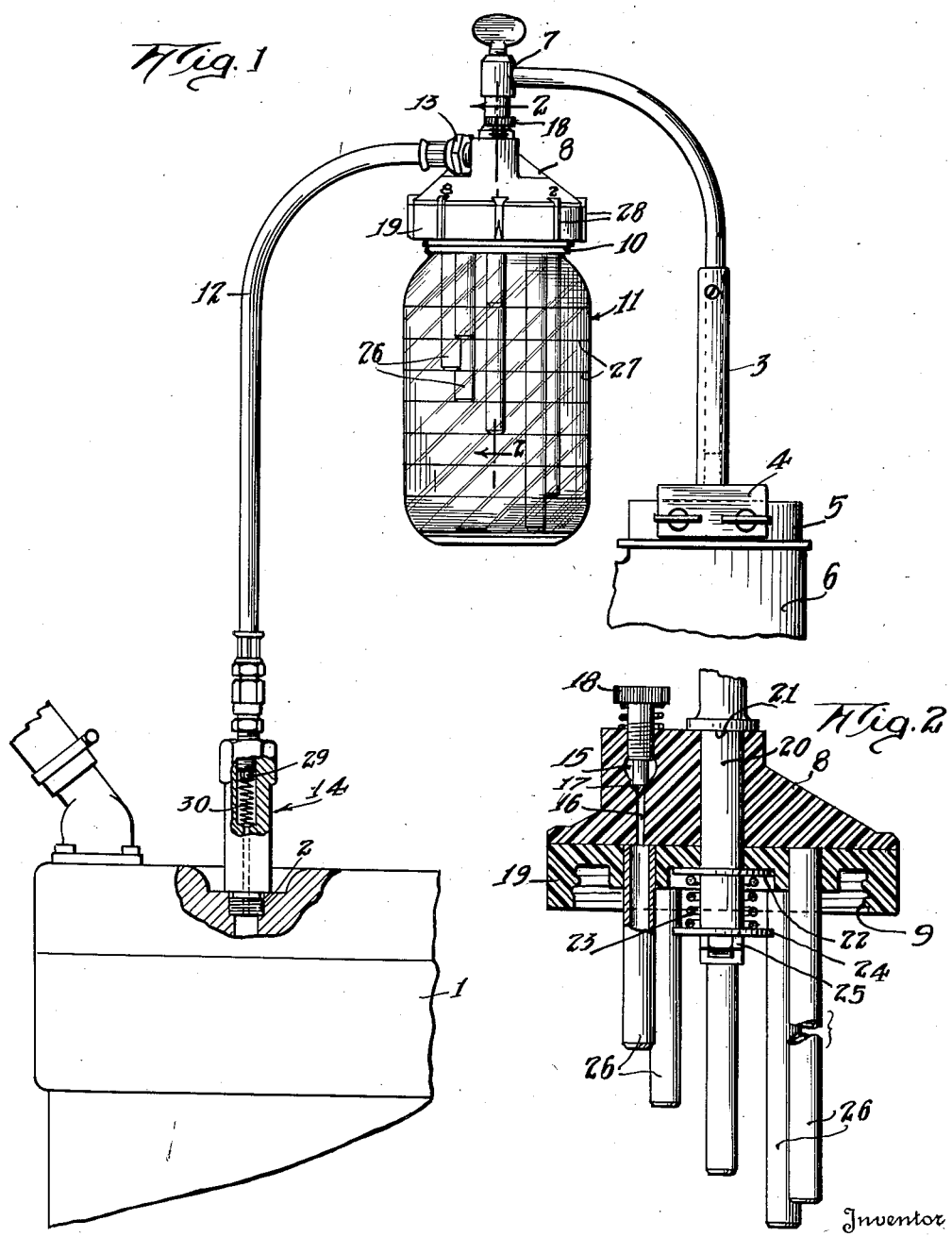

Patented Feb. 26, 1952

2,587,060

UNITED STATES PATENT OFFICE 2,587,060

APPARATUS FOR LUBRICATING INTERNAL-COMBUSTION ENGINES

Harry R. Meyer, Santa Barbara, Calif.

Application March 2, 1946, Serial No. 651,489

3 Claims. (Cl. 222—42)

This invention pertains to a method and apparatus for lubricating the cylinders of internal combustion engines of the type wherein spark plugs are employed to ignite compressed gases and including pistons having intake and compression strokes. While the invention is adapted primarily to lubrication of the upper cylinder walls in addition to lubricating and freeing the piston rings and the exhaust valve stem, it is not limited thereto.

Considerable difficulty has been heretofore experienced in effectively lubricating the upper walls of cylinders of internal combustion engines, as well as lubricating the piston rings, particularly with respect to regulation of the amount of lubricant supplied and the time during which such lubricant is supplied. It is well known that if lubricant is continuously supplied to the cylinder of an internal combustion engine during operation of the engine and firing of the spark plug used in connection with each cylinder, there will be a great amount of carbon formed by burning of the lubricant which, when so carbonized, is not only wasted, but such carbon is a hindrance to efficient operation of the engine.

It is one object of this invention to provide an apparatus for lubricating the cylinders, piston rings, and exhaust valve stems of an internal combustion engine of such nature that a predetermined definite amount of lubricant will be supplied, and which means will provide for accurately regulating the rate at which lubricant is supplied to the cylinder being lubricated.

It is a further object of this invention to provide a method of lubricating the cylinders, piston rings, and exhaust valve stems of an internal combustion engine wherein a predetermined amount of lubricant is drawn into the cylinder by the vacuum created by the suction stroke of the internal combustion engine piston, and wherein the amount of lubricant delivered is limited to a predetermined amount and may be delivered to the cylinder at any desired rate.

A further object of the invention is to provide an apparatus of the character herein disclosed which is simple in operation, has a minimum number of parts, is inexpensive to manufacture and unlikely to get out of repair.

Various other objects and advantageous features of the invention may be had from the following description, and one embodiment thereof may be seen in the accompanying drawings wherein similar characters of reference designate corresponding parts; and wherein Fig. 1 is a fragmentary view, partly in elevation and partly in section, showing a lubricating apparatus constructed in accordance with the ideas disclosed by this invention.

Fig. 2 is a view, partly in section and partly in elevation, showing the control means for accurately controlling the amount and rate of flow of lubricant from the reservoir to the cylinder to be lubricated.

Referring to the drawings, there is shown a fragmentary portion 1 of an internal combustion engine having a threaded opening 2 normally receiving the spark plug with which each cylinder of the internal combustion engine is equipped, and which provides means for igniting the power fuel and actuating the pistons (not shown) of the internal combustion engine, one of which is contained in each cylinder thereof.

A bracket 3 having a screw clamp 4 on its lowermost end, and which clamp may be attached to any convenient part of the internal combustion engine or its supporting frame, or may be attached to any other supporting device, is provided, and in this instance is shown as being secured to the air horn 5 of a carburetor 6 from which the air cleaner has been removed. This bracket extends upwardly and has removably attached as by means of a movable connection 7 a supporting cap 8 which is internally screw threaded as at 9 to receive the external threads 10 of a reservoir or jar 11 for containing lubricant. A flexible conduit 12 is secured at one end to a fitting 13 on the cap 8, and at its opposite end is provided with a fitting 14 externally threaded on its lowermost end so it may be screwed into the opening 2 in which the spark plug of the internal combustion engine is normally disposed.

The fitting 13 of the cap 8 extends outwardly from an opening 15 in the cap, and from which opening 15 a passage 16 leads downwardly to the bottom of the cap. Flow of lubricant through this passage 16, the opening 15 and conduit 12 to the cylinder of the internal combustion engine 1 is controlled as to rate of flow by a needle valve 17 screw threaded into the cap 8 and having a knurled head 18 by which the needle valve may be rotated to vary the size of the exit end of the passage 16.

The lower section 19 of the cap 8, which contains the internal threads 9, is mounted for rotation with respect to the upper portion of the cap 8 by being supported on a rod 20 extending downwardly through the upper and lower portions of the cap, such rod 20 having the mounting means 7 on its uppermost end. A shoulder 21 on the rod 20 bears against the uppermost end of the cap 8, and the lower portion 19 of the cap is rotatably mounted on the rod 20 by being supported thereon by a washer 22 resiliently urged upwardly by a spring 23 deposited between the washer 22 and another washer 24 bearing against and supported by a nut 25 on the lowermost end of the rod 20. With this construction, the two sections of the cap 8 are resiliently urged into close contacting relation.

The rotatable portion 19 of the cap 8 is provided with a plurality of tubes 26, each tube being of a predetermined length and extending successively downwardly into the reservoir 11 as shown in Fig 1. The tubes 26 extend completely through the portion 19 of the cap 8 and provide a passageway from different levels within the interior of the reservoir 11 to the passage 16 and tube 12 when any one of the tubes 26 is brought into registry with the passage 16 by rotation of the portion 19 of the cap 8 with respect to the upper portion thereof.

As shown in Fig. 1, the reservoir 11 is provided with graduations 27 dividing the reservoir into a plurality of sections, each one of which contains a predetermined like amount of lubricant, and the tubes 26 are of such relative length that there is one tube 26 terminating at the bottom level of each graduated section of the reservoir. As also shown in Fig. 1, the lower portion 19 of the cap 8 is provided with graduations 28, there being one graduation mark for each tube 26, and such graduation marks being alignable by rotation of the lower portion 19 of the cap 8 with a corresponding mark on the upper portion of the cap 8 to indicate when the tube 26 corresponds to a particular graduation mark, representing that tube as in registry with the passage 16 and the cap 8 to provide an outlet from the reservoir 11 to the clyinder of the internal combustion engine. As also shown in Fig. 1, the fitting 14 is provided with a ball check valve 29 normally urged towards closed position by a spring 30 to prevent pressure resulting from the exhaust stroke of the piston in the cylinder from being transmitted to the reservoir 11.

In the operation of this apparatus, the spark plug of the cylinder to be lubricated is first removed and replaced by the fitting 14, which may be of any desired size to accommodate itself to the spark plug opening, and the indicating mark, representing, for example, the shortest tube 26 which ends at the bottom of the first graduation 27 on the reservoir 11, is positioned so that such shortest tube 26 is in registry with the passage 16 in the cap 8. The needle valve 17 is then adjusted so that the desired rate of flow of lubricant from the passage 16 to the opening 15 may be had and the engine is placed in operation, preferably at idling speed. Lubricant is drawn from the reservoir 11 through the passages 16 and 15, the tube 12 past the ball check valve 29 into the cylinder by the vacuum created by the intake stroke of the piston. It is preferable that the needle valve 17 be so positioned that the entire amount of lubricant contained between the uppermost graduation mark 27 and the top of the reservoir will not be drawn into the cylinder by a single intake stroke of the piston, but will require a plurality of intake strokes of the piston to withdraw the predetermined amount of lubricant from the reservoir, which amount is determined by the tube 26 in registry with the passage 16 terminating at the bottom of the particular graduated area of the reservoir.

The return or compression stroke of the piston compresses the lubricant in the cylinder, any loss of pressure from the cylinder back through the tube 12 to the reservoir 11 being prevented by the check valve 29, and forces the lubricant in and around the piston rings, over the piston and over the upper cylinder walls. Upon the return or exhaust stroke of the piston, compression is retained in the cylinder and upon the opening of the exhaust valve (not shown) a portion of the lubricant exhausts out and around the exhaust valve stem to lubricate the same. The engine is continued in operation until, through successive strokes of the piston, the entire amount of lubricant contained in the area defined by a pair of graduation marks 27 on the reservoir 11 is drawn into the cylinder and distributed as hereinbefore set forth to lubricate the piston rings, piston and cylinder walls.

After completing the operation on the cylinder first selected, the fitting 14 is removed and replaced with a spark plug, the spark plug from the next cylinder to be lubricated is removed and replaced by the fitting 14, the portion 19 of the cap 8 is adjusted to bring the next longer tube 26 into registry with the passage 16 and the operation hereinbefore described is repeated. This operation is repeated for each cylinder to be lubricated, it being apparent that successive adjustments of the portion 19 of the cap 8 to bring each successive longer tube 26 into registry with the passage 16 in the cap 8 will withdraw successive like predetermined amounts of lubricant from the reservoir and deliver such lubricant to the cylinder to be lubricated.

Referring to the drawings in the preceding description, it will be seen that there is provided a method and apparatus for lubricating the cylinders, piston rings, and exhaust valve stem of internal combustion engines which has numerous novel and advantageous features. The method is such that a predetermined amount of lubricant is delivered by the vacuum created by the successive strokes of the piston in the cylinder being lubricated, and such lubricant is distributed to the point desired lubricated by the compression stroke of the piston.

The apparatus is such as to positively regulate the amount of lubricant delivered to each cylinder being lubricated without the control of such amount being dependent upon manual operation or observation, and the rate of flow of lubricant to the cylinder may be controlled to obtain the best results from the lubricant.

Having fully described my invention, it is to be understood that I do not wish to be limited to the details herein set forth, but my invention is of the full scope of the appended claims.

I claim:

1. In apparatus of the character described, in which predetermined amounts of fluid are dispensed from a container, a two-part cap member for said container, the two parts of said cap member being spring-biased into engagement with one another and being rotatable with respect to one another, one of said cap parts having a plurality of conduits of different predetermined lengths, each with its axis equidistant from the axis of rotation of said parts, said one part having fastening means thereon arranged to releasably hold said container, the other one of said cap parts having a channel registrable with any one of said conduits moved adjacent thereto; an adjustable valve member arranged to control the flow of fluid through said channel, a conduit having one of its ends in communication with said channel and the other one of its ends being adapted to screw-threadably enter the tapped spark plug opening normally found in present-day internal combustion engines.

2. An apparatus for lubricating the cylinders, pistons and valves of an internal combustion engine, comprising: a gooseneck bracket for attachment to an internal combustion engine in proximity to the cylinders thereof; a depending spindle at the end of said bracket; upper and lower relatively rotatable valve members mounted on said spindle and having confronting valve faces; a spring urging said valve members together; the lowermost valve member having a plurality of valve ports arranged in a circle and depending dispensing tubes of different lengths communicating with said valve ports; a transparent container removably attachable to said lower valve member and embracing said tubes; said upper valve member having a single port adapted on relative movement of said valve members to register in succession with the valve ports of said lower valve member; a needle valve controlling the port in said upper valve member; a tube extending from said upper valve member including a fitting at its extremity for substitution of a spark plug in any of the cylinders of an internal combustion engine; and a check valve to prevent back flow from said internal combustion engine to said tube.

3. An apparatus for lubricating the cylinders, pistons and valves of an internal combustion engine, comprising: a bracket for attachment to an internal combustion engine in proximity to the cylinders thereof; a depending spindle at the end of said bracket; upper and lower relatively rotatable valve members mounted on said spindle and having confronting valve faces; means urging said valve members together; the lowermost valve member having a plurality of valve ports and depending dispensing tubes of different lengths communicating with said valve ports; a container removably attachable to said lower valve member and embracing said tubes; said upper valve member having a single port adapted on relative movement of said valve members to register in succession with the valve ports of said lower valve member; a tube extending from said upper valve member including a fitting at its extremity for substitution for a spark plug in any of the cylinders of an internal combustion engine; an adjustable valve to regulate flow to said internal combustion engine; and a check valve to prevent back flow from said internal combustion engine to said container.

HARRY R. MEYER.

REFERENCES CITED

The following references are of record in the file of this patent:

UNITED STATES PATENTS

| Number | Name | Date |
|---|---|---|
| 373,537 | Smith | Nov. 22, 1887 |
| 1,193,842 | Stephan | Aug. 8, 1916 |
| 1,347,035 | Hendron | July 20, 1920 |
| 1,356,967 | De Clairmont | Oct. 26, 1920 |
| 1,557,675 | Eichelberger | Oct. 20, 1925 |
| 1,850,739 | Bradley | Mar. 22, 1932 |
| 2,229,063 | Field | Jan. 21, 1941 |